(12) United States Patent
Mezhibovsky et al.

(10) Patent No.: US 8,495,422 B2
(45) Date of Patent: Jul. 23, 2013

(54) METHOD AND SYSTEM FOR RESETTING A SUBSYSTEM OF A COMMUNICATION DEVICE

(75) Inventors: Evgeny Mezhibovsky, Waterloo (CA); Joseph Tu-Long Deu-Ngoc, Waterloo (CA); Alan K. C. Sung, Waterloo (CA); Jeffrey P. Laver, Waterloo (CA); Anthony W. Tod, Waterloo (CA)

(73) Assignee: Research In Motion Limited, Waterloo (CA)

(*) Notice: Subject to any disclaimer, the term of this patent is extended or adjusted under 35 U.S.C. 154(b) by 426 days.

(21) Appl. No.: 12/813,878

(22) Filed: Jun. 11, 2010

(65) Prior Publication Data

US 2011/0202797 A1 Aug. 18, 2011

Related U.S. Application Data

(60) Provisional application No. 61/303,925, filed on Feb. 12, 2010.

(51) Int. Cl.
*G06F 11/00* (2006.01)

(52) U.S. Cl.
USPC .............................. 714/24; 714/23; 714/47.1

(58) Field of Classification Search
USPC ............... 714/2, 5.1, 10, 11, 15, 23, 24, 47.1, 714/47.2
See application file for complete search history.

(56) References Cited

U.S. PATENT DOCUMENTS

| | | | |
|---|---|---|---|
| 5,398,265 A | 3/1995 | Gabaldon et al. | |
| 5,860,125 A | 1/1999 | Reents | |
| 6,463,529 B1 | 10/2002 | Miller et al. | |
| 6,792,527 B1 | 9/2004 | Allegrucci | |
| 6,963,970 B2 | 11/2005 | Culter et al. | |
| 7,000,154 B1 | 2/2006 | LeDuc et al. | |
| 7,386,764 B2 | 6/2008 | LeDuc et al. | |
| 7,650,552 B2 | 1/2010 | Pourbigharaz et al. | |
| 2002/0152425 A1 | 10/2002 | Chaiken et al. | |
| 2003/0224768 A1* | 12/2003 | Adjamah | 455/418 |
| 2006/0053331 A1* | 3/2006 | Chou et al. | 714/2 |
| 2007/0124522 A1* | 5/2007 | Ellison et al. | 710/260 |

(Continued)

FOREIGN PATENT DOCUMENTS

| | | |
|---|---|---|
| GB | 2384333 A | 7/2003 |
| GB | 2415799 A | 1/2006 |
| WO | 2007/049162 A2 | 5/2007 |

OTHER PUBLICATIONS

European Examination Report issued by the European Patent Office dated Apr. 11, 2010 for corresponding European Patent Application No. 10165703.9.

(Continued)

*Primary Examiner* — Joseph D Manoskey
(74) *Attorney, Agent, or Firm* — Gowling Lafleur Henderson LLP

(57) ABSTRACT

Described herein are a method, system, and computer readable medium for resetting a subsystem of a communication device. The method involves utilizing a subsystem error handler to generate a reset request signal indicating the subsystem has experienced an exception; distributing to a software component, residing externally to the subsystem, a status message indicative of a current state of the subsystem; performing a reset of the subsystem in response to the reset request signal; and rebooting the subsystem. When the subsystem can be reset without performing a system wide reset of the communication device, communication device downtime is reduced, which facilitates a positive user experience.

33 Claims, 9 Drawing Sheets

U.S. PATENT DOCUMENTS

| | | | |
|---|---|---|---|
| 2009/0019274 A1* | 1/2009 | Pilot et al. | 713/2 |
| 2009/0075600 A1 | 3/2009 | Sanders et al. | |
| 2009/0177807 A1 | 7/2009 | Wong | |
| 2009/0217078 A1* | 8/2009 | Cassett et al. | 714/2 |
| 2010/0042820 A1* | 2/2010 | Clemm et al. | 713/2 |

OTHER PUBLICATIONS

Candea at al., "Reducing Recovery Time in a Small Recursively Restartable System", Proc. International Conference on Dependable Systems and Networks (DSN-2002), Jun. 2002, pp. 1-10.

forums.crackberry Website; "Those of you with 8350I texting problems"—http://forums.crackberry.com/f137/those-you-8350i-texting-problems-124115/; Dec. 2008; Date Last Accessed: Feb. 25, 2010.

forums.crackberry Website; "Master Radio Reset"—http://forums.crackberry.com/f137/master-radio-reset-344590/—Feb. 2009; Date Last Accessed: Feb. 25, 2010.

fullerton.edu Website; "Blackberry FAQs"—http://www.fullerton.edu/IT/services/Telecom/FAQ/blackberry_faq.asp; Apr. 8, 2008; Date Last Accessed: Feb. 25, 2010.

techrepublic.com Website; "SolutionBase: Techniques you can use to troubleshoot your Blackberry"—http://articles.techrepublic.com.com/5100-22_11-5683244.html; Jun. 13, 2005; Date Last Accessed: Feb. 25, 2010.

blackberryforums.com Website; "Radio Core Catfailed . . . Reset?"—http://www.blackberryforums.com/general-9000-series-discussion-bold/181434-radio-core-catfailed-reset.html; Mar. 16, 2009; Date Last Accessed: Feb. 25, 2010.

gsmhosting.com Forum Website; "Radio Core Catfailed"—http://forum.gsmhosting.com/vbb/archive/t-654483.html; Dec. 29, 2008; Date Last Accessed: Feb. 25, 2010.

Web Archive Forum; "Reset and Clear Codes for Blackberry"; http://www.mobile-files.com/forum/archive/index.php/t-21461.html; Jan. 22, 2006.

Extended European Search Report issued by the European Patent Office dated Oct. 8, 2010 for corresponding European Patent Application No. 10165703.9.

* cited by examiner

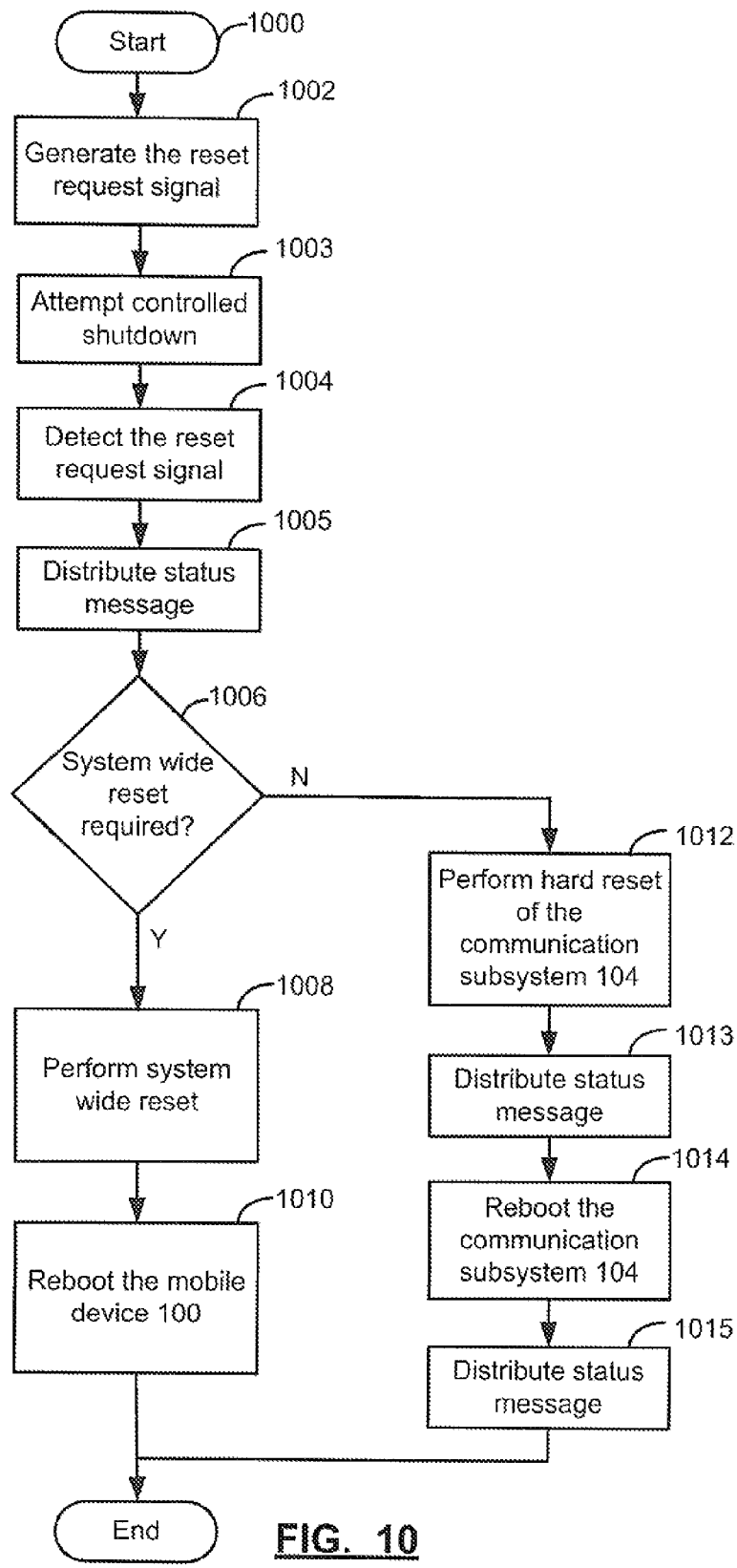

METHOD AND SYSTEM FOR RESETTING A SUBSYSTEM OF A COMMUNICATION DEVICE

CROSS REFERENCE TO RELATED APPLICATION

Pursuant to 35 U.S.C. §119(e), this application claims the benefit of provisional U.S. Patent Application No. 61/303,925, filed Feb. 12, 2010 and entitled "Method and System for Resetting a Subsystem of a Communication Device," which is hereby incorporated by reference in its entirety.

TECHNICAL FIELD

The present disclosure is directed at a method and system for resetting a subsystem of a communication device. More particularly, the present disclosure is directed at a method and system for resetting the subsystem of the communication device without performing a system wide reset on the communication device.

BACKGROUND

When used in relation to a communication device, performing a "system wide reset" refers to returning all software and hardware of the communication device to a known, initial state. While performing a system wide reset is sometimes used to restore stability and usability to the communication device following errors such as certain types of serious software exceptions, performing a system wide reset is detrimental in that the communication device is typically rendered unusable while it is rebooting following the system wide reset. It is not uncommon for the communication device to require one or two minutes to reboot, which can significantly inconvenience the owner of the communication device. For the sake of simplicity, conventional error handling systems in communication devices often default to performing system wide resets instead of utilizing a less conspicuous form of error handling.

Accordingly, it would be beneficial to reduce the frequency at which system wide resets occur on communication devices and to introduce to communication devices an error handling system that emphasizes versatility in addition to simplicity.

BRIEF DESCRIPTION OF THE DRAWINGS

For a better understanding of the various example embodiments described herein and to show more clearly how they may be carried into effect, reference will now be made, by way of example only, to the accompanying drawings which show at least one example embodiment and in which:

FIG. 10 is a flowchart depicting a method to reset only the communication subsystem component of the mobile device of FIG. 1 without performing a system wide reset of the mobile device of FIG. 1, according to a second example embodiment.

DETAILED DESCRIPTION

Figure 1:
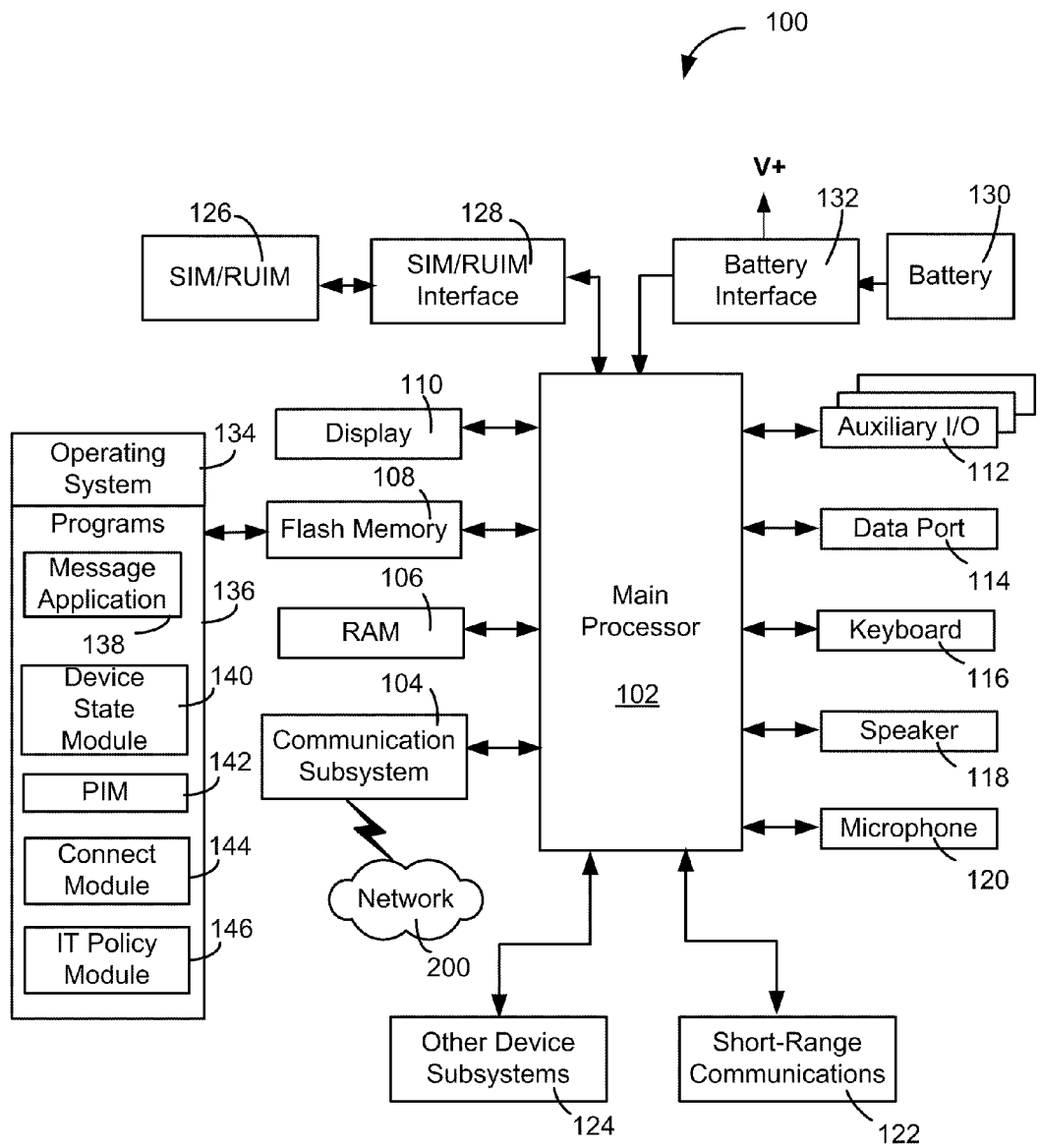
FIG. 1 is a block diagram of an example embodiment of a mobile device.

According to a first aspect, there is provided a method for resetting a subsystem of a communication device. The method includes utilizing a subsystem error handler to generate a reset request signal indicating the subsystem has experienced an exception; distributing to a software component, residing externally to the subsystem, a status message indicative of a current state of the subsystem; performing a reset of the subsystem in response to the reset request signal; and rebooting the subsystem. The subsystem may, for example, be a communication subsystem of the communication device.

The reset of the subsystem may be a hard reset that is performed by asserting a reset input that is communicatively coupled to the subsystem.

The status message may be one of a plurality of different status messages. Each of the plurality of different status messages can be indicative of a different state of the subsystem. Additionally or in alternative, different status messages may be used depending on which particular subsystem's status is being distributed via the status message. For example, status messages pertaining to a first subsystem may be formatted in one manner indicative of the first subsystem, while status messages pertaining to a second subsystem may be formatted in a second manner indicative of the second subsystem. Alternatively, the status messages may be formatted so as not to distinguish between subsystems.

Following rebooting the subsystem, a subsequent status message indicating that the subsystem has been rebooted may be distributed to the software component. The software component may take appropriate action in response to the subsequent status message, such as commence initialization procedures.

Prior to performing the reset of the subsystem, it may be determined whether performing a hard reset of the subsystem without performing a system wide reset on the communication device would cause an exception to occur external to the subsystem. If not, a hard reset of the subsystem can be performed in response to the reset request signal without performing a system wide reset by asserting a reset input communicatively coupled to the subsystem. If so, the system wide reset can be performed in response to the reset request signal. Determining whether the exception would occur can involve checking whether the software component external to the subsystem has set a system wide reset required flag. Alternatively or additionally, determining whether the exception would occur can involve receiving, in response to the status message, a response from the software component indicating that the hard reset would cause the exception to occur.

The subsystem may have a processing core configured to be reset without resetting a main processor of the communication device such that performing the hard reset of the subsystem does not perform a system wide reset on the communication device.

The method may also include utilizing a system error handler communicatively coupled to the subsystem error handler to detect the reset request signal and utilizing the system error handler to perform the hard reset of the subsystem. The system error handler may send the status messages to the software component, and the software component may respond to the system error handler.

One or more status messages indicative of a current state of the subsystem may be distributed to one or more software components that reside externally to the subsystem.

The reset request signal may be generated in response to detection of a catastrophic failure in the subsystem. The reset request signal may also be generated in response to detection of a number of soft errors in excess of a soft error threshold.

Prior to performing a hard reset of the subsystem, the subsystem may undergo or attempt to undergo a controlled shutdown.

Prior to rebooting the subsystem, software to be executed by the subsystem may be copied from a persistent store into a volatile store such that the subsystem executes the software after rebooting.

A proxy that resides external to the subsystem may be used to communicate on behalf of the subsystem when the subsystem is being reset. While rebooting the subsystem, state information sent from the software component may be stored in the proxy. Following rebooting the subsystem, the subsystem may be configured according to the state information stored in the proxy.

According to a second aspect, there is provided a communication device, having a main processor; a subsystem having a reset input that is communicatively coupled to the processor; and a memory that is communicatively coupled to the processor and to the subsystem. The memory has encoded thereon statements and instructions to configure the communication device to carry out any of the aforedescribed methods.

According to a third aspect, there is provided a computer readable medium having encoded thereon statements and instructions to configure a communication device to carry out any of the aforedescribed methods.

Beneficially, in the foregoing aspects when a system wide reset of the communication device is not performed but instead one or more particular subsystems are individually reset, the communication device typically loses for a very short amount of time (e.g. a few seconds) the functionality for which the particular subsystems are responsible as opposed to losing, often for a longer period of time, the functionality of the entire communication device. This provides a more pleasant user experience.

Also beneficially, in the foregoing aspects when the status message indicative of the current state of the subsystem is sent to various software components resident on the communication device, the software components can take action in response to knowledge of the current state. For example, if the subsystem is about to be reset, the software components can perform clean-up procedures in preparation for the reset. If the subsystem has just rebooted, the software components can perform reinitialization procedures. Furthermore, certain of the above aspects particularly contribute to the versatility of the exception handling system of the communication device. For example, the status message may be formatted to indicate which particular subsystem's status is being distributed via the status message to provide the software component with additional information regarding how to respond to the status message. Additionally or alternatively, when the system error handler and the software component are communicatively coupled, the software component may respond to the status message if sent from the system error handler or alternatively initiate communication with the system error handler to, for example, inform the system error handler whether the system wide reset should be performed instead of a subsystem only reset.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The example embodiments described herein generally relate to a mobile wireless communication device, also referred to herein as a mobile device or a communication device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1 through 4.

Referring first to FIG. 1, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards. The GSM/GPRS wireless network is used worldwide, and in recent years Enhanced Data GSM Environment (EDGE) and Universal Mobile Telecommunications Service (UMTS) have also been adopted. New standards, such as Long Term Evolution (LTE) are still being developed, but it is believed that they will have similarities to the network behavior described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some example embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some example embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
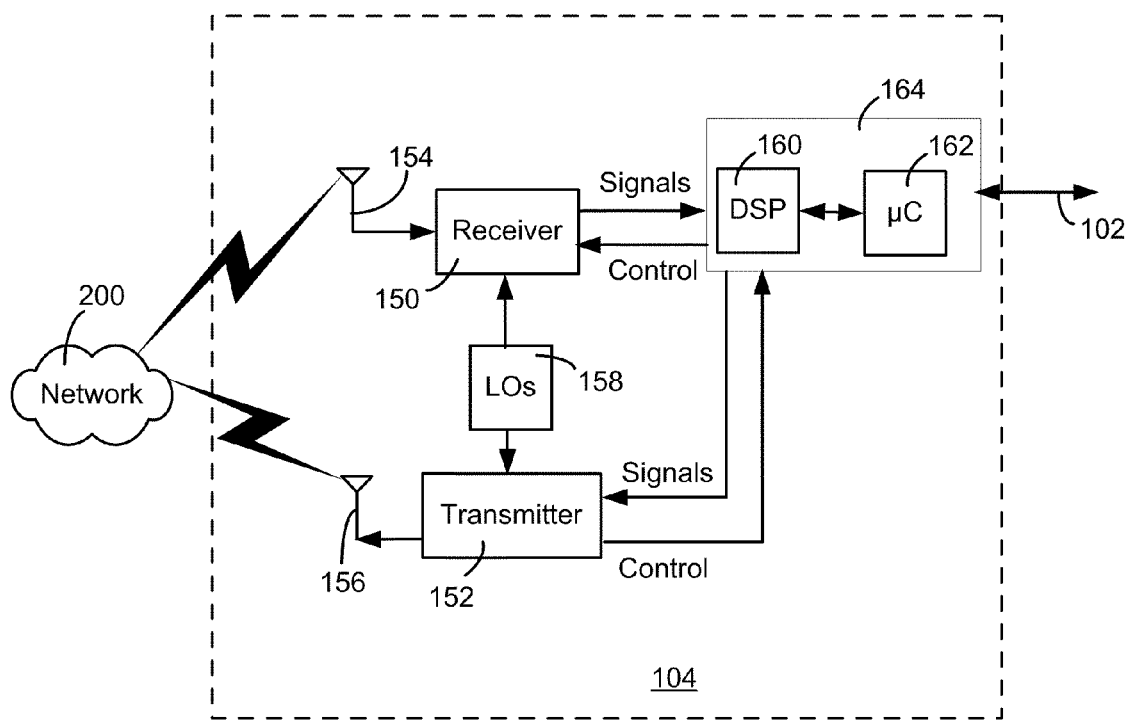
FIG. 2 is a block diagram of an example embodiment of a communication subsystem component of the mobile device of FIG. 1.

Referring now to FIG. 2, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160 in conjunction with a microcontroller (μC) 162; collectively, the DSP 160 and μC 162 pair is a processing core hereinafter referred to as the "communication core" 164. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the communication core 164. In a similar manner, signals to be transmitted are processed, including modulation and encoding, by the communication core 164. These processed signals are input to the transmitter 152 for digital-to-analog (D/A) conversion, frequency up conversion, filtering, amplification and transmission over the wireless network 200 via the antenna 156. The communication core 164 not only processes communication signals, but also provides for receiver and transmitter control. For example, the gains applied to communication signals in the receiver 150 and the transmitter 152 may be adaptively controlled through automatic gain control algorithms implemented in the communication core 164.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
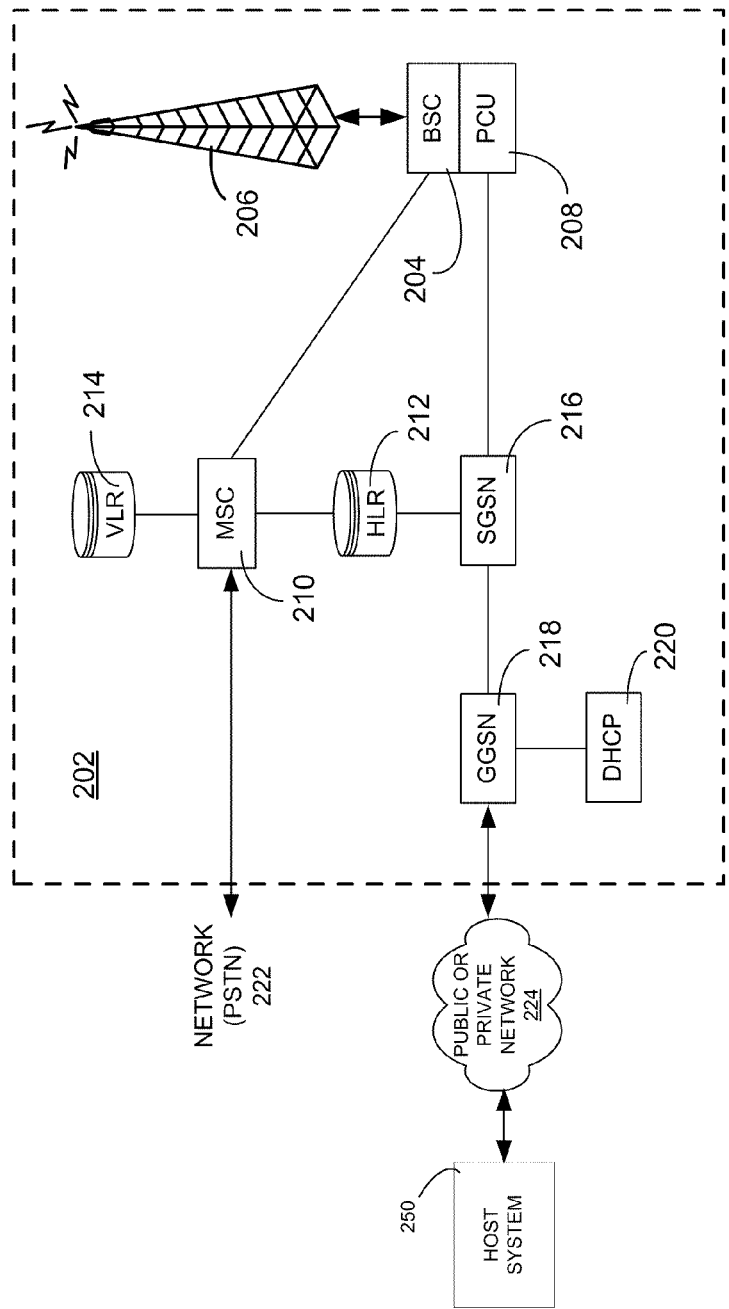
FIG. 3 is an example block diagram of a node of a wireless network.

Referring now to FIG. 3, a block diagram of an example implementation of a node 202 of the wireless network 200 is shown. In practice, the wireless network 200 comprises one or more nodes 202. In conjunction with the connect module 144, the mobile device 100 can communicate with the node 202 within the wireless network 200. In the example implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Figure 4:
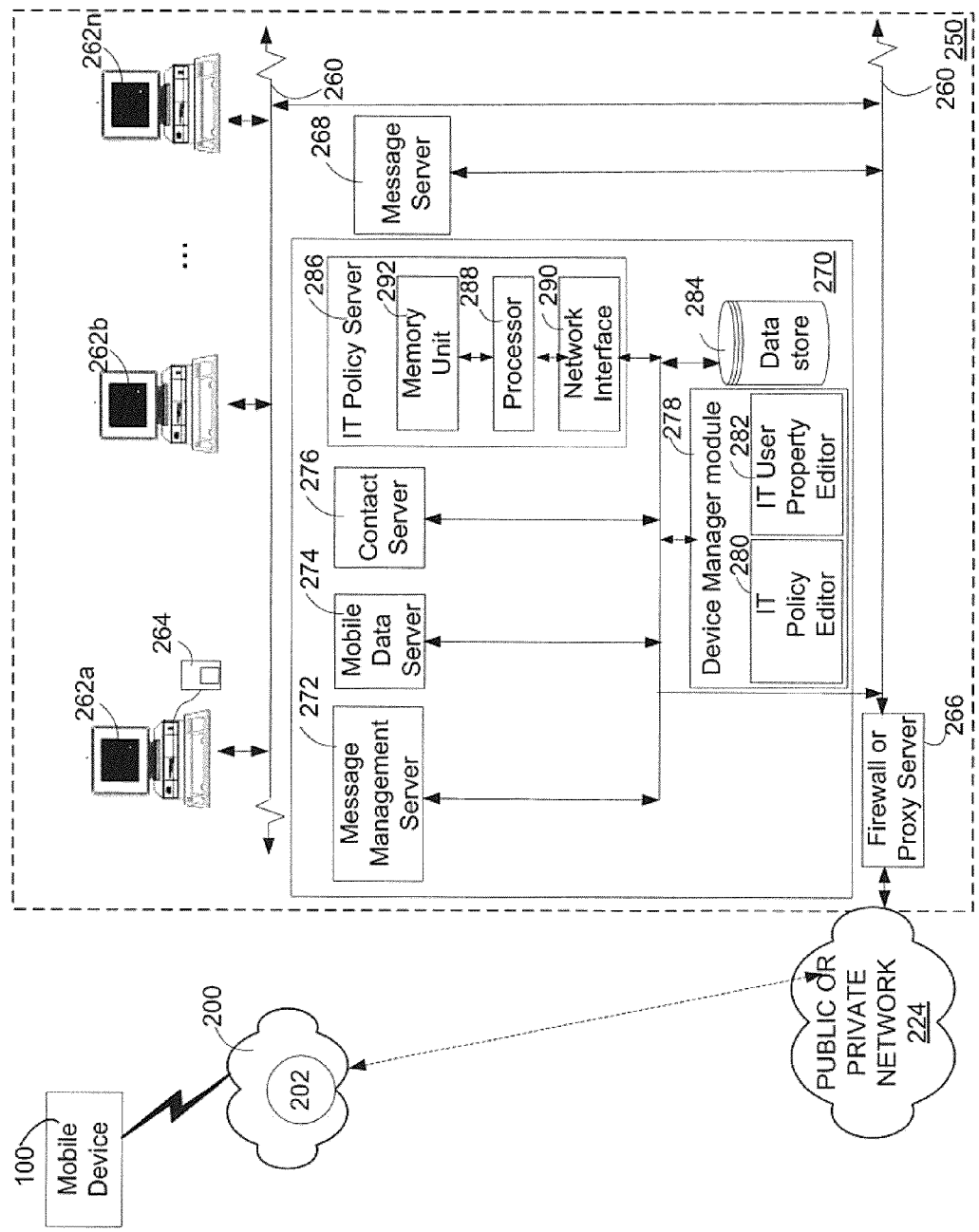
FIG. 4 is a block diagram illustrating components of a host system in one example configuration for use with the wireless network of FIG. 3 and the mobile device of FIG. 1.

Referring now to FIG. 4, shown therein is a block diagram illustrating components of an example configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's mobile device 100 is situated on a LAN connection. The cradle 264 for the mobile device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this example configuration. More generally, the host system 250 may represent a smaller part of a larger network (not shown) of the organization, and may comprise different components and/or be arranged in different topologies than that shown in the example embodiment of FIG. 4.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative example embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some example embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have e-mail messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g. 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may comprise multiple message management servers 272, particularly in variant implementations where a large number of mobile devices need to be supported.

Alternatively, in some example embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g. encryption algorithms, password rules, etc.), specifying themes or applications that are allowed to run on the mobile device 100, and the like.

Figure 5:
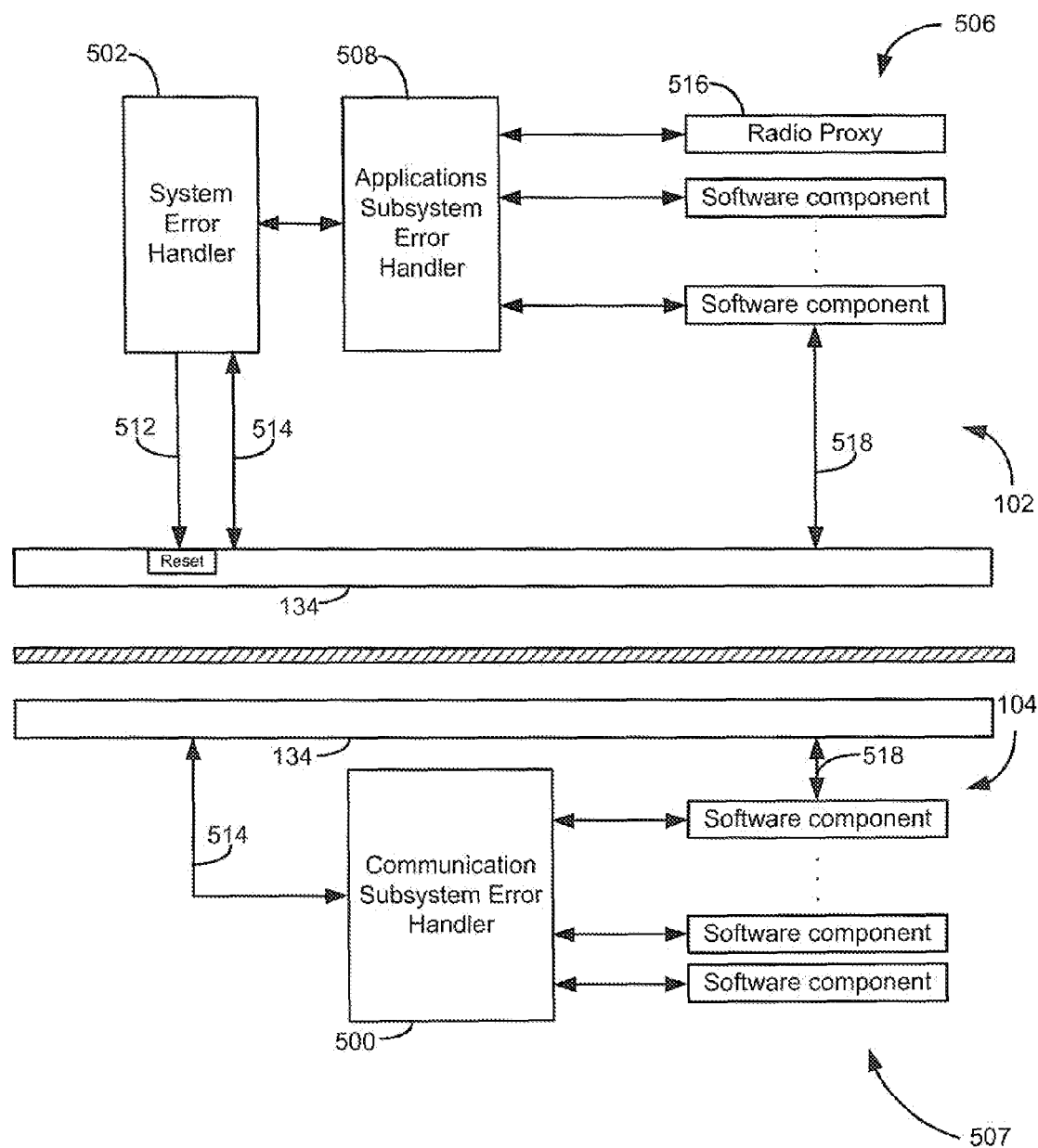
FIG. 5 is a block diagram of an example embodiment of components utilized for error handling in the communication subsystem component of the mobile device of FIG. 1 and in a main processor of the mobile device of FIG. 1.

Referring now to FIG. 5, there is shown a block diagram of a variety of components executed by the communication core 164 of the communication subsystem 104 and the main processor 102, including those components utilized for error handling, according to one example embodiment. The various components depicted in FIG. 5 beneficially allow the communication subsystem 104, and more particularly the communication core 164 of the communication subsystem 104, to be reset in response to exceptions that the communication subsystem 104 experiences. Instead of performing a system wide reset on the mobile device 100 from which the mobile device 100 may require one or two minutes to reboot, according to an example embodiment the communication subsystem 104 alone may be reset and can complete rebooting in a very short amount of time (e.g. a few seconds). Consequently, instead of all the subsystems of the mobile device 100 being rendered non-usable for e.g. one or two minutes as occurs when a system wide reset is performed, the mobile device 100 loses for a few seconds only the functionality for which the communication subsystem 104 is responsible (e.g.: telephone calls, data transmissions) when the communication subsystem 104 alone is reset. This significantly improves a user's experience using the mobile device 100, as the user often will not notice any difference in the behavior of the mobile device 100 when only the communication subsystem 104 is unusable for a few seconds.

In FIG. 5, the main processor 102 and the communication subsystem 104 each execute a variety of software components 506, 507. The main processor 102 executes application software components 506, while the communication subsystem 104 executes communication software components 507. The application software components 506 include software responsible for interfacing with the various subsystems 106 to 124 of the mobile device 100. The communication software components 507 include components responsible for modulating and demodulating the communication signals sent to and from the wireless network 200 and for communicating parameters such as wireless signal strength and the name of the wireless network 200 to the application software components 506.

The communication subsystem 104 has a communication subsystem error handler (CSEH) 500 that can be called by any of the communication software components 507 when, for example, one of the communication software components 507 experiences an exception. The CSEH 500 can communicate with a system error handler (SEH) 502. In an example embodiment in which the CSEH 500 is executing on the communication core 164 and the SEH 502 is executing on the main processor 102, communication between the CSEH 500 and the SEH 502 is done between processing cores, or "intercore". Consequently, a message 514 sent from the CSEH 500 to the SEH 502 is first sent from the CSEH 500 to a portion of the operating system 134 executing on the communication core 164. The portion of the operating system 134 executing on the communication core 164 then conveys the message 514 to the main processor 102 by sending an interrupt signal (not shown) to a portion of the operating system 134 that is executing on the main processor 102. The main processor 102 then conveys the message 514 originally sent by the CSEH 500 to the SEH 502. The SEH 502 can analogously send a message to the CSEH 500. In this way, the CSEH 500 and the SEH 502 are communicatively coupled. Other known methods of intercore communication can alternatively be utilized. For example, the CSEH 500 and SEH 502 may communicate directly with each other synchronously or asynchronously using polling or interrupts, respectively. Alternatively, different operating systems may be executed by the communication core 164 and the main processor 102. The application software components 506 and the communication software components 507 may similarly engage in intercore communication by sending messages 518 via the operating system 134 as well.

Optionally, one of the application software components 506 is a radio proxy 516 that can communicate with the other application software components 506 on behalf of the communication subsystem 104. The radio proxy 516 caches information from the communication subsystem 104 that can be accessed by software components resident external to the communication subsystem 104 ("externally resident software components"), such as the application software components 506. Consequently, using the radio proxy 516 reduces the frequency at which the externally resident software components establish sessions with the communication subsystem 104.

The main processor 102 also has an applications subsystem error handler (ASEH) 508 that can be called by any of the application software components 506 when, for example, any of the application software components 506 experiences an exception. The ASEH 508 can perform error handling as required in response to an exception experienced by any of the application software components 506 as is known to persons skilled in the art. The ASEH 508 can bi-directionally communicate with the SEH 500 and the application software components 506 can communicate with the SEH 502 via the ASEH 508.

In an example embodiment, the SEH 502 is the component responsible for triggering a reset of the communication subsystem 104 without triggering a system wide reset. The SEH 502 can be a component that forms part of the operating system 134 or a component external to the operating system 134. To reset only the communication subsystem 104, the SEH 502 sends a reset signal 512 to the operating system 134. The operating system 134 subsequently instructs the main processor 102 to assert a hardware reset (not shown) that is coupled to the communication subsystem 102 and that performs a hard reset of the communication subsystem 104. By "hard reset", it is meant that the communication subsystem 104 is reset without first performing any controlled shutdown procedure. Any communication sessions that the communications subsystem 104 may have open with the application software components 506, for example, will be immediately and abruptly terminated when the hard reset is performed. In an example embodiment, the communication subsystem 104 begins to reboot when the SEH 502 releases the reset signal 512, which subsequently causes the main processor 102 to release the hardware reset. However, in alternative example embodiments the communication subsystem 104 may begin to reboot a certain length of time after the main processor 102 initially asserts the hardware reset, regardless of when the main processor 102 releases the hardware reset.

Figure 6:
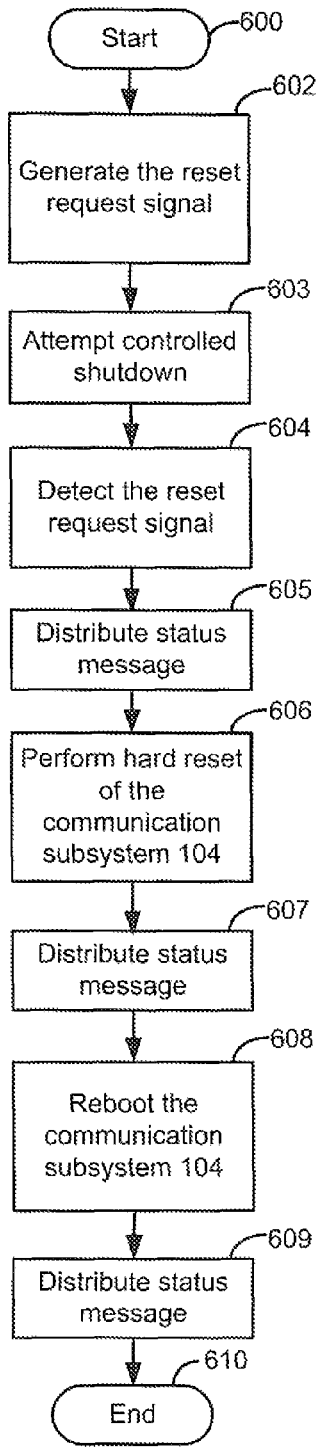
FIGS. 6 to 9 are flowcharts depicting a method to reset only the communication subsystem component of the mobile device of FIG. 1 without performing a system wide reset of the mobile device of FIG. 1, according to a first example embodiment.

Referring now to FIG. 6, there is shown a flowchart depicting a method to reset only the communication subsystem 104 of the mobile device 100 without performing a system wide reset of the mobile device 100, according to an example embodiment. The method begins at block 600 and proceeds to block 602 where the CSEH 500 generates a reset request signal, which is transmitted to the SEH 502 as one of the messages 514 according to the intercore communication protocol described above. Generation of the reset request signal occurs in response to the communication subsystem 104 experiencing an exception and that the CSEH 500 has determined the communication subsystem 104 should be reset so as to recover from the exception.

Figure 7:
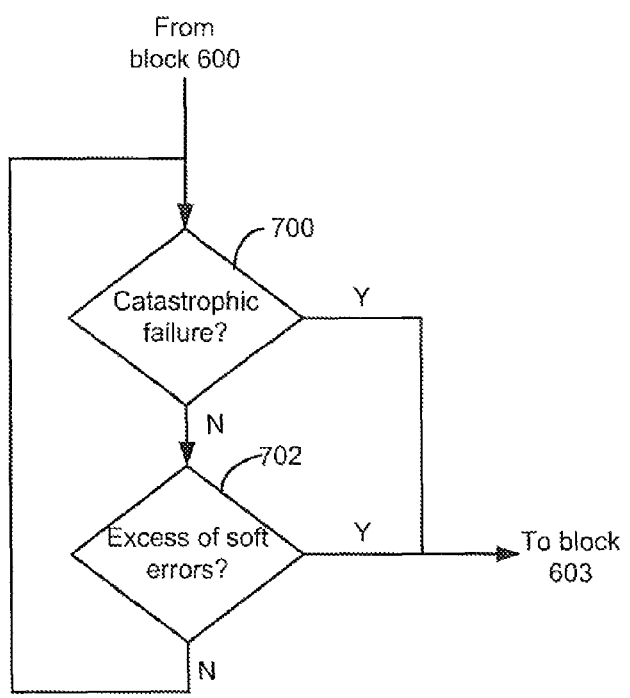

FIG. 7 depicts one example embodiment of the logic that may be implemented by block 602 to generate the reset request signal. First, the CSEH 500 may generate the reset request signal if it detects that a "catastrophic failure" has occurred within the communication subsystem 104 (block 700). A "catastrophic failure" refers to a failure in the communication subsystem 104 from which the communication subsystem 104 cannot meaningfully recover without resetting. Example causes of catastrophic failures include when the communication core 164 attempts to access an inaccessible region of memory; when the communication core 164 attempts to allocate an additional block of memory but memory is exhausted; and when the software executed by the communication core 164 becomes corrupted.

Second, the CSEH 500 may generate the reset request signal if it counts a number of "soft errors" in excess of a soft error threshold (block 702). In contrast to a "catastrophic failure", a "soft error" refers to an error that may be correctable by using known error correction methods, such as resetting the particular software component 507 responsible for the soft error, without resetting the communication subsystem 104. However, if after employing these error correction methods the soft errors continue, the communication subsystem 104 should be reset according to an example embodiment. Accordingly, the CSEH 500 monitors the number of soft errors that the communication subsystem 104 experiences during a given time period, compares the number of soft errors to the soft error threshold, and generates the reset request signal if the soft error threshold is exceeded. In an example embodiment, the soft error threshold is one soft error during any ten minute period.

Following generation of the reset request signal, in an example embodiment the CSEH 500 attempts to perform a controlled, or graceful, shutdown of the communication subsystem 104 (block 603). A controlled shutdown of the communication subsystem 104 involves the CSEH 500 sending shutdown instructions to the communication software components 507 in communication with the CSEH 500, such as those communication software components 507 responsible for wireless and audio functionality. Wireless functionality refers to transmission of the communication signals to and from the wireless network 200, while audio functionality refers to communication with the microphone 120 and the speaker 118 so as to facilitate voice telephone calls, for example. Performing a controlled shutdown prior to performing the hard reset of the communication subsystem 104 is beneficial in that if a connection with the wireless network 200 is interrupted because of a controlled shutdown, the carrier that manages the wireless network 200 will not classify the interruption as a dropped call, whereas if the connection is interrupted because the communication subsystem 104 is undergoing a hard reset, the carrier does classify the disconnection as a dropped call. Performing a controlled shutdown also allows any cached information on the communication subsystem 104 to be flushed prior to resetting, and to ensure that the antenna element 156 ceases transmitting prior to the reset so that RF communications standards are not contravened.

The reset request signal indicates that the communication subsystem 104 has experienced some type of exception, or failure, and should be reset according to an example embodiment. In an example embodiment the reset request signal is sent to the SEH 502 as one of the messages 514 according to the intercore communication protocol described above; in this way, the SEH 502 detects the reset request signal (block 604). In an alternative example embodiment, the reset request signal may be sent to a watchdog, which upon receipt of the reset request signal may directly reset the communication subsystem 104.

Some, although not necessarily all, of the externally resident software components may subscribe to receive status updates (hereinafter interchangeably referred to as "status messages") from the SEH 502 that describe the current state of the communication subsystem 104; the subset of the externally resident software components that receive these status updates from the SEH 502 are hereinafter referred to as the "subscribed components". In an example embodiment, following receipt of the reset request signal the SEH 502 retrieves debugging information in the form of activity logs from an internal memory of the communication subsystem 104 to facilitate subsequent debugging. The SEH 502 also distributes to all of the subscribed components a status update (block 605) indicating that a failure has occurred in the communication subsystem 104, that the communication subsystem 104 has requested to be reset by sending the reset request signal, and that the communication subsystem 104 will shortly be reset. In an example embodiment this status update is called a COMM_STATE_RESET_REQ message. When the subscribed components receive the COMM_STATE_RESET_REQ message and until they receive a subsequent status message from the SEH 502 indicating that the communication subsystem 104 has rebooted, they know not to attempt communication with the communication subsystem 104. The subscribed components in an example embodiment may include components among the following: at least some of the application software components 506; the data connection management system and its clients, such as a wireless access family (WAF) manager, a tunnel manager module used to manage tunnels between the application software components 506 and the wireless network 200 and an IP modem; the radio proxy 516; those components responsible for implementing GAN/UMA (Generic Access Network/Unlicensed Mobile Access) functionality, such as the WAS (WLAN Access Stratum) layer; and the SIM/RUIM interface 128.

Figure 8:
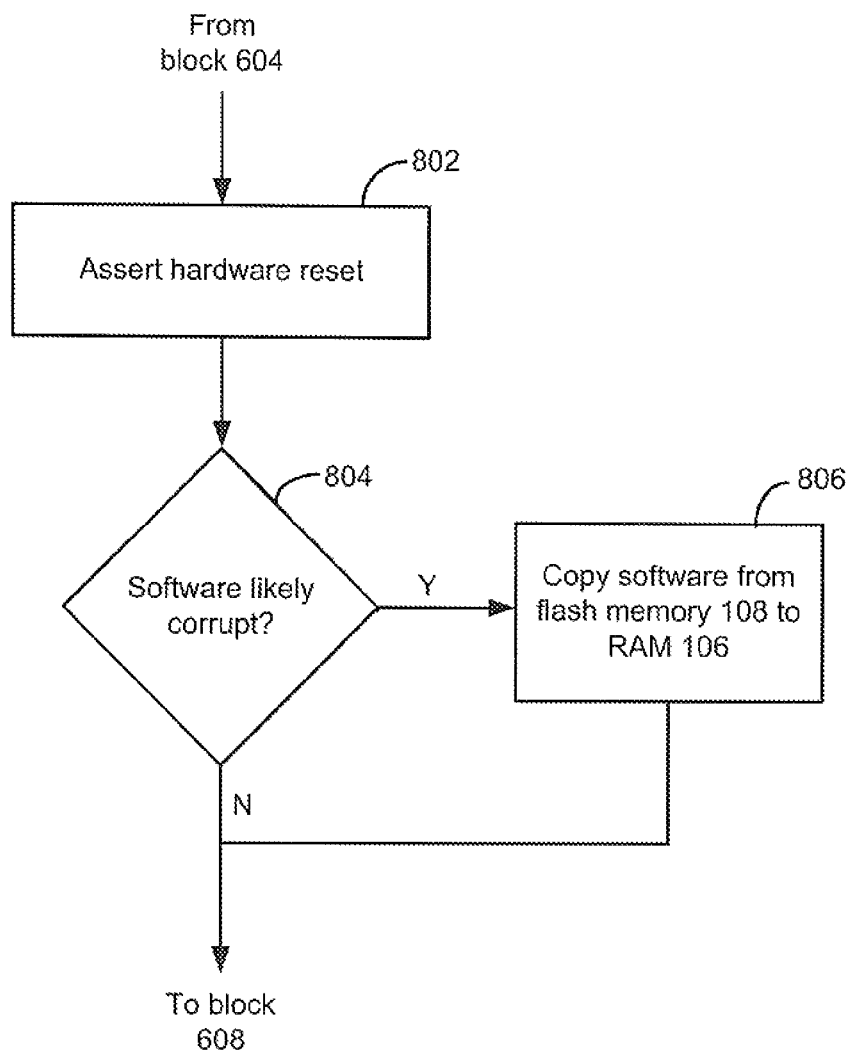

A set amount of time (typically a few milliseconds) after the CSEH 500 attempts to perform a controlled shutdown, and regardless of whether the controlled shutdown is successful, the SEH 502 performs a hard reset on the communication subsystem 104 (block 606). One example embodiment of a method for performing the hard reset is depicted in FIG. 8. At block 802 of FIG. 8, the SEH 502 sends the reset signal 512 and the operating system 134 consequently asserts the hard reset input to the communication subsystem 104. When the hard reset is asserted, all communications with the communication subsystem 104 are terminated regardless of their current state.

When the communication subsystem 104 is reset, the SEH 502 distributes to the subscribed components a status update indicating that the communication subsystem 104 is currently off and is unable to respond to messages (block 607); in an example embodiment this status update is called a COMM_STATE_OFF message.

In response to one or both of the COMM_STATE_RESET_REQ and COMM_STATE_OFF messages in an example embodiment, the subscribed components execute clean-up procedures in preparation for the communication subsystem 104 resetting. "Clean-up procedures" refers to those procedures undertaken in response to a shutdown or an imminent shutdown of the communication subsystem 104. For example, the radio proxy 516 modifies any cached copies of data it has so as to ensure that the data it transmits to its clients accurately reflects the fact that the communication subsystem 104 is being reset (e.g.: signal strength will be set to zero during the reset); the WAF manager will set WAF status on the communication subsystem 104 to "deactivated" and will notify its clients that wireless access has been deactivated; and the tunnel manager module will close any open sockets and inform its clients that tunneling will not be permitted until the communication subsystem 104 reboots. Any one or more of the subscribed components may execute the clean-up procedures in response solely to either the COMM_STATE_RESET_REQ message or the COMM_STATE_OFF message, or they may execute some clean-up procedures in response to the COMM_STATE_RESET_REQ message and additional clean-up procedures in response to the COMM_STATE_OFF message.

The failure experienced by the communication subsystem 104 and which is the cause of the reset may be caused by execution of corrupt software (block 804). If so, the main processor 102 may copy the software executed by the communication subsystem 104 from the flash memory 108 into RAM 106 (block 806) so that when the communication subsystem 104 reboots, it executes software that has been newly copied into RAM 106 from a reliable repository and that is not corrupt. In order to determine whether the reset is due to corrupt software, the CSEH 500 can monitor how many hard resets of the communication subsystem 104 have occurred over a set period of time in an example embodiment. If the number of hard resets is in excess of a hard reset threshold, then the CSEH 500 may conclude that the communication subsystem 104 is failing because it is repeatedly executing the same corrupt software in RAM 106, and it may consequently overwrite the corrupt software in RAM 106 with the uncorrupt software stored in the flash memory 108. Whether the software being executed by the communication subsystem 104 is likely corrupt can also be determined in alternative ways. For example, the CSEH 500 may perform a CRC check of the software being executed by the communication subsystem 104; alternatively, the CSEH 500 can send a failure code detailing the nature of the exception to the SEH 502 (e.g.: illegal instruction exception or misaligned access exception) along with the reset request signal to allow the SEH 502 to determine based on the failure code whether the software on the communication subsystem 104 is likely corrupt.

In an alternative example embodiment, the CSEH 500 does not check to determine whether the software executed by the communication subsystem 104 is likely corrupt, and instead the main processor 102 simply always overwrites the software in RAM 106 with the uncorrupt software stored in the flash memory 108.

Figure 9:
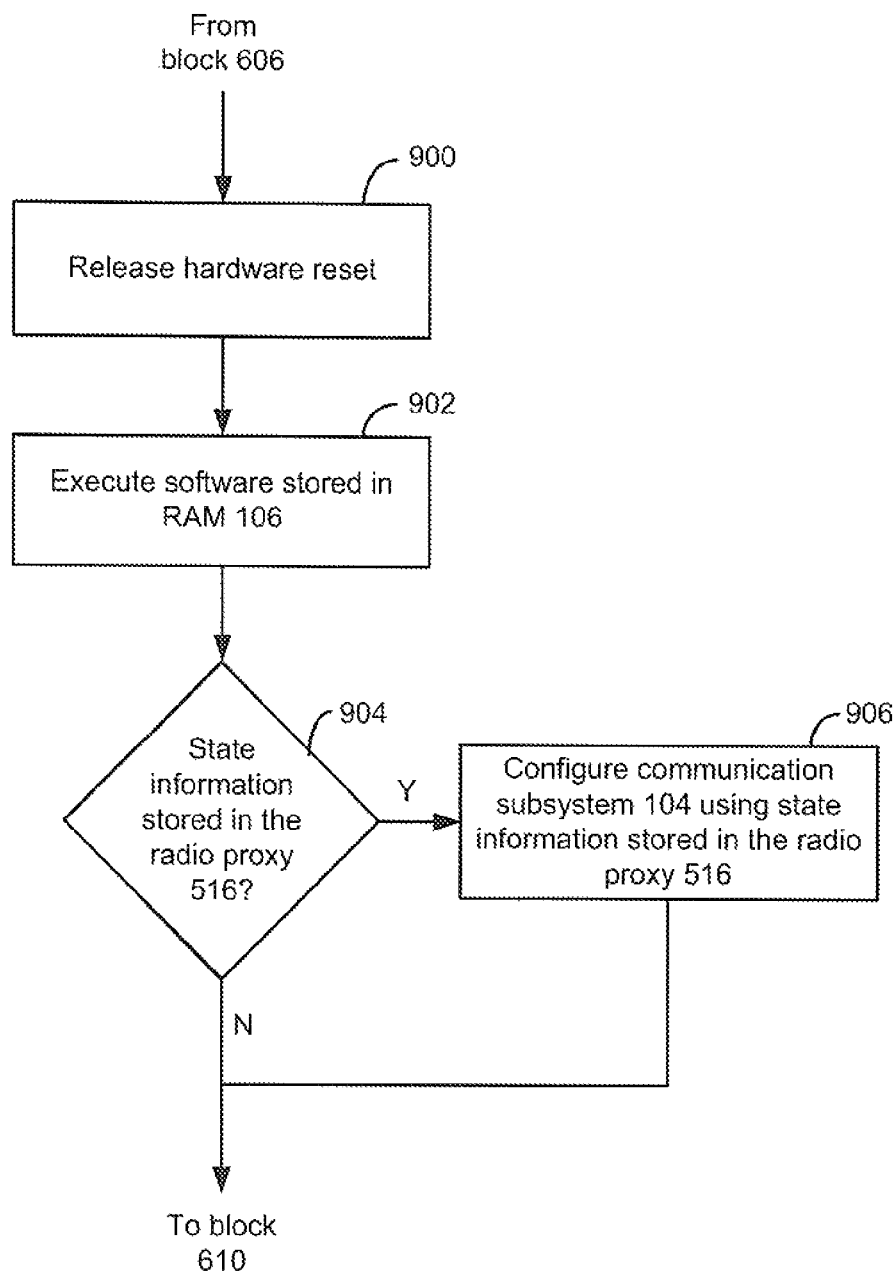

Referring again to FIG. 6 and also to FIG. 9, following resetting the communication subsystem 104 the SEH 502 instructs the communication subsystem to reboot (block 608). To do this, the SEH 502 releases the reset signal 512 and the operating system 134 consequently instructs the main processor 102 to release the hardware reset of the communication subsystem 104 (block 900). After the hardware reset is released, the communication subsystem 104 begins to reboot by executing the communication subsystem software that is resident in RAM 106 (block 902). In an example embodiment which utilizes the radio proxy 516, the radio proxy 516 may contain state information that it obtained when communicating with one of the externally resident software components, such as one of the application software components 506, on behalf of the communication subsystem 104 while the communication subsystem 104 was off (block 904). If so, after the communication subsystem 104 reboots, the radio proxy 516 transmits the state information to the communication subsystem 104 and in doing so configures the communication subsystem 104 (block 906). Configuring the communication subsystem 104 in this way is beneficial in that if the radio proxy 516 has completed communicating with one of the software components external to the communication subsystem 104, that software component will believe that the communication subsystem 104 is in a certain state by virtue of having communicated with the radio proxy 516. By updating the state of the communication subsystem 104, the radio proxy 516 helps to ensure that the state of the communication subsystem 104 is up-to-date.

Following rebooting of the communication subsystem 104, the SEH 502 distributes to all of the subscribed components a status update indicating that the communication subsystem 104 has rebooted and is ready to respond to messages (block 609). In an example embodiment, this status update is the COMM_STATE_RESTARTED message. Upon receiving the COMM_STATE_RESTARTED message the subscribed components perform their own re-initialization procedures in preparation for again establishing sessions with the communication subsystem 104. While in an example embodiment three status messages are utilized, in alternative any number of status messages can be utilized to provide information to the subscribed components as desired to enable them to react to the different states of the subsystem that is being reset. Such functionality increases the versatility of the error handling system.

Referring now to FIG. 10, there is shown a flowchart depicting a method to reset only the communication subsystem 104 of the mobile device 100 without performing a system wide reset of the mobile device 100, according to a second example embodiment. In the example embodiment of FIG. 10, while the communication subsystem 104 can sometimes be reset without performing a system wide reset, occasionally a system wide reset is performed. This is in contrast to the example embodiment described in relation to FIGS. 6 through 9, above, in which system wide resets are avoided.

Blocks 1000, 1002, 1003, 1004 and 1005 of FIG. 10 correspond to blocks 600, 602, 603, 604 and 605 of FIG. 6. In contrast to the example embodiment of FIG. 6, at block 1006 the SEH 502 determines whether a system wide reset is to be performed on the mobile device 100 in lieu of a reset on the communication subsystem 104 only. For example, a system wide reset is performed when the reset request signal is sent and one of the subscribed components has initiated an intercore function call with one of the communication software components 507, that communication software component 507 has not yet returned a response, and the subscribed component is not configured to perform the clean-up and re-initialization procedures that are required when the intercore function call is interrupted by a reset of only the communication subsystem 104. To implement this functionality, prior to completing the intercore function call the subscribed component sets a "system wide reset required" flag in the SEH 502 when establishing a session with the communication subsystem 104, and clears the "system wide reset required" flag following completion of its session with the communication subsystem 104. Prior to sending the reset signal 512 to the operating system 134, the SEH 502 checks to see whether the system wide reset required flag is set. If so, the SEH 502 performs a system wide reset (block 1008) on the mobile device 100, and the mobile device 100 subsequently reboots (block 1010) according to methods known in the art. If the system wide reset required flag is not set, the SEH 502 instead resets only the communication subsystem 104 (block 1012) and distributes the COMM_STATE_OFF status message to the subscribed components (block 1013). The communication subsystem 104 subsequently reboots (block 1014), following which the SEH 502 distributes the COMM_STATE_RESTARTED status message to the subscribed components (block 1015). Blocks 1012 to 1015 illustrate an example of a method that corresponds to that described in respect of blocks 606 to 609 of FIG. 6, above.

Alternatively, instead of setting the system wide reset flag, the subscribed component that is currently in intercore communication with the communication subsystem 104 can in response to the COMM_STATE_RESET_REQ message send a signal to the SEH 500 to inform it that a reset of only the communication subsystem 104 cannot be properly performed and that a system wide reset will instead be required. In an example embodiment, in addition to sending a signal to the SEH 500 in response to the COMM_STATE_RESET_REQ signal, the subscribed component can also send a signal to the SEH 500 in response to any of the other status messages, as desired.

Beneficially, the radio proxy 516 can be used in conjunction with the example embodiment of FIG. 10 to reduce the frequency with which system wide resets are performed. In this example embodiment, the radio proxy 516 caches data outside of the communication subsystem 104, and can therefore respond to queries from the externally resident software components without having to engage in intercore communication with the communication subsystem 104. Consequently, when using the radio proxy 516 to respond to queries from the externally resident software components, the "system wide reset required" flag is not set at all or is set for a shorter period of time than when the externally resident software component establishes direct contact with the communication subsystem 104, and the likelihood of a system wide reset occurring is accordingly reduced.

The foregoing example embodiments may be encoded on to a computer readable medium that is readable by the main processor 102, the communication core 164 of the communication subsystem 104, or by any other suitably configured controller or processor so as to configure the mobile device 100 to have the functionality described above. The computer readable medium may be the flash memory 108, the RAM 106, or any other suitable disc or semiconductor based memory.

For the sake of convenience and ease of understanding, the example embodiments described above focus on resetting only the communication subsystem 104 without performing a system wide reset. However, in alternative example embodiments any of the subsystems of the mobile device 100, suitably configured, can be reset in an analogous manner as the communication subsystem 104 is in an example embodiment, resulting in the mobile device 100 having a versatile error handling system. A subsystem that has its own subsystem error handler configured to send the reset request signal to the SEH 502 and that is configured to be reset following transmittal of the reset signal 512 by the SEH 502 can be similarly reset as the communication subsystem 104 is, above. For example, the software components of the subsystem being reset may be executing on a dedicated processing core separate from the main processor 102. This allows the SEH 502 to perform a hard reset of this subsystem alone.

Alternatively, the software components of the subsystem to be reset may be executing on the main processor 102. For example, in FIG. 5 the application software components 506, ASEH 508 and SEH 502 all execute on the main processor 102. The SEH 502 may reset the application software components 506 according to a method analogous to that of FIG. 6, but in the example embodiment of FIG. 5 effectively only a system wide reset would be possible since from the perspective of a user resetting the main processor 102 is tantamount to a system wide reset. Other subsystems that may be reset according to the aforedescribed methods include any of the subsystems 106 to 124.

In the foregoing embodiments, the status messages that the SEH 502 sends are all prefixed with COMM_STATE. The COMM_STATE prefix informs the subscribed components that it is the communication subsystem 104 in particular whose state is changing. In an alternative embodiment, the SEH 502 may distribute status messages having alternative prefixes. For example, the SEH 502 may distribute status messages prefixed using a more generic prefix such as SUB_SYS; example status messages in this case are SUB_SYS_STATE_RESET_REQ and SUB_SYS_STATE_OFF. A more generic prefix such as SUB_SYS can be used when the subscribed components do not benefit from having information about which particular subsystem is being reset or undergoing other state transitions. In a further alternative embodiment, the SEH 502 may send status messages having different prefixes that depend on which subsystem is undergoing state transitions. For example, if the communication subsystem 104 is being reset the status messages may be prefixed using COMM_STATE, whereas if the auxiliary input/output (I/O) subsystem 112 is being reset the status messages may be prefixed with AUX_STATE. The SEH 502 may send status messages prefixed in any number of ways, thereby facilitating system versatility.

For the sake of convenience, the example embodiments above are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

FIGS. 6-10 are flowcharts of example embodiment methods. Some of the steps illustrated in the flowchart may be performed in an order other than that which is described. Also, it should be appreciated that not all of the steps described in the flow chart are required to be performed, that additional steps may be added, and that some of the illustrated steps may be substituted with other steps.

While particular example embodiments have been described in the foregoing, it is to be understood that other embodiments are possible and are intended to be included herein. It will be clear to any person skilled in the art that modifications of and adjustments to the foregoing example embodiments, not shown, are possible.

The invention claimed is:

1. A method for resetting a subsystem of a communication device, the method comprising:
    utilizing a subsystem error handler to generate a reset request signal indicating the subsystem has experienced an exception;
    distributing to a software component, residing externally to the subsystem, a status message indicative of a current state of the subsystem;
    performing a reset of the subsystem in response to the reset request signal; and
    rebooting the subsystem.

2. A method as claimed in claim 1 wherein the reset of the subsystem is a hard reset performed by asserting a reset input communicatively coupled to the subsystem.

3. A method as claimed in claim 2 wherein the subsystem comprises a processing core configured to be reset without resetting a main processor of the communication device such that performing the hard reset of the subsystem does not perform a system wide reset on the communication device.

4. A method as claimed in claim 2 further comprising utilizing a system error handler communicatively coupled to the subsystem error handler to detect the reset request signal and wherein the system error handler performs the hard reset of the subsystem.

5. A method as claimed in claim 2 wherein prior to performing the hard reset of the subsystem, the subsystem undergoes a controlled shutdown.

6. A method as claimed in claim 1 wherein the status message is one of a plurality of different status messages, each of the different status messages indicative of a different state of the subsystem.

7. A method as claimed in claim 6 wherein the plurality of different status messages is formatted in a manner indicative of the subsystem whose state is being distributed.

8. A method as claimed in claim 1 further comprising following rebooting the subsystem, distributing to the software component a subsequent status message indicating that the subsystem has been rebooted.

9. A method as claimed in claim 1 wherein the subsystem is a communication subsystem.

10. A method as claimed in claim 1 wherein the reset request signal is generated in response to detection of a catastrophic failure in the subsystem.

11. A method as claimed in claim 1 wherein the reset request signal is generated in response to detection of a number of soft errors in excess of a soft error threshold.

12. A method as claimed in claim 1 further comprising prior to rebooting the subsystem, copying software to be executed by the subsystem from a persistent store into a volatile store such that the subsystem executes the software after rebooting.

13. A method as claimed in claim 1 further comprising utilizing a proxy, residing externally to the subsystem, to communicate on behalf of the subsystem when the subsystem is being reset.

14. A method as claimed in claim 13 further comprising:
    while rebooting the subsystem, storing state information sent from the software component in the proxy; and
    following rebooting the subsystem, configuring the subsystem according to the state information stored in the proxy.

15. A method as claimed in claim 1 further comprising:
    determining whether performing a hard reset of the subsystem without performing a system wide reset on the communication device would cause an exception to occur external to the subsystem;
    when performing the hard reset would not cause the exception to occur, performing the hard reset of the subsystem in response to the reset request signal without performing the system wide reset by asserting a reset input communicatively coupled to the subsystem; and
    when performing the hard reset would cause the exception to occur, performing the system wide reset in response to the reset request signal.

16. A method as claimed in claim 15 wherein determining whether the exception would occur comprises receiving, in response to the status message, a response from the software component indicating that the hard reset would cause the exception to occur.

17. A communication device, comprising:
    a main processor;
    a subsystem having a reset input and communicatively coupled to the processor; and
    a memory communicatively coupled to the main processor and to the subsystem, the memory having encoded thereon statements and instructions to configure the communication device to carry out a method comprising:
        utilizing a subsystem error handler to generate a reset request signal indicating the subsystem has experienced an exception;
        distributing to a software component, residing externally to the subsystem, a status message indicative of a current state of the subsystem;
        performing a reset of the subsystem in response to the reset request signal; and
        rebooting the subsystem.

18. A communication device as claimed in claim 17 wherein the reset of the subsystem is a hard reset performed by asserting a reset input communicatively coupled to the subsystem.

19. A communication device as claimed in claim 18 wherein the subsystem comprises a processing core configured to be reset without resetting the main processor such that performing the hard reset of the subsystem does not perform a system wide reset on the communication device.

20. A communication device as claimed in claim 18 wherein the method further comprises utilizing a system error handler communicatively coupled to the subsystem error handler to detect the reset request signal and wherein the system error handler performs the hard reset of the subsystem.

21. A communication device as claimed in claim 18 wherein prior to performing the hard reset of the subsystem, the subsystem undergoes a controlled shutdown.

22. A communication device as claimed in claim 17 wherein the status message is one of a plurality of different status messages, each of the different status messages indicative of a different state of the subsystem.

23. A communication device as claimed in claim 22 wherein the plurality of different status messages is formatted in a manner indicative of the subsystem whose state is being distributed.

24. A communication device as claimed in claim 17 wherein the method further comprises following rebooting the subsystem, distributing to the software component a subsequent status message indicating that the subsystem has been rebooted.

25. A communication device as claimed in claim 17 wherein the subsystem is a communication subsystem.

26. A communication device as claimed in claim 17 wherein the reset request signal is generated in response to detection of a catastrophic failure in the subsystem.

27. A communication device as claimed in claim 17 wherein the reset request signal is generated in response to detection of a number of soft errors in excess of a soft error threshold.

28. A communication device as claimed in claim 17 wherein the method further comprises prior to rebooting the subsystem, copying software to be executed by the subsystem from a persistent store into a volatile store such that the subsystem executes the software after rebooting.

29. A communication device as claimed in claim 17 wherein the method further comprises utilizing a proxy, residing externally to the subsystem, to communicate on behalf of the subsystem when the subsystem is being reset.

30. A communication device as claimed in claim 29 wherein the method further comprises:
  while rebooting the subsystem, storing state information sent from the software component in the proxy; and
  following rebooting the subsystem, configuring the subsystem according to the state information stored in the proxy.

31. A communication device as claimed in claim 17 wherein the method further comprises:
  determining whether performing a hard reset of the subsystem without performing a system wide reset on the communication device would cause an exception to occur external to the subsystem;
  when performing the hard reset would not cause the exception to occur, performing the hard reset of the subsystem in response to the reset request signal without performing the system wide reset by asserting a reset input communicatively coupled to the subsystem; and
  when performing the hard reset would cause the exception to occur, performing the system wide reset in response to the reset request signal.

32. A communication device as claimed in claim 31 wherein determining whether the exception would occur comprises receiving, in response to the status message, a response from the software component indicating that the hard reset would cause the exception to occur.

33. A non-transitory computer readable medium having encoded thereon statements and instructions to configure a communication device to carry out a method comprising:
  utilizing a subsystem error handler to generate a reset request signal indicating the subsystem has experienced an exception;
  distributing to a software component, residing externally to the subsystem, a status message indicative of a current state of the subsystem;
  performing a reset of the subsystem in response to the reset request signal; and
  rebooting the subsystem.

* * * * *